United States Patent
Schipper

(10) Patent No.: US 7,549,338 B1
(45) Date of Patent: Jun. 23, 2009

(54) NANOSTRUCTURE SENSOR OF PRESENCE AND CONCENTRATION OF A TARGET MOLECULE

(75) Inventor: John F. Schipper, Palo Alto, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/973,998

(22) Filed: Sep. 28, 2007

Related U.S. Application Data

(60) Provisional application No. 60/849,494, filed on Sep. 28, 2006.

(51) Int. Cl.
*G01H 3/00* (2006.01)
*G01J 3/44* (2006.01)

(52) U.S. Cl. .................. 73/592; 73/40.5 A; 73/579; 73/590; 73/596; 356/301

(58) Field of Classification Search ............ 73/592, 73/40.5 A, 579, 590, 596; 356/301
See application file for complete search history.

(56) References Cited

U.S. PATENT DOCUMENTS

| | | | | |
|---|---|---|---|---|
| 6,002,471 | A * | 12/1999 | Quake | 356/73 |
| 6,483,581 | B1 * | 11/2002 | Ben-Amotz et al. | 356/301 |
| 6,711,423 | B2 * | 3/2004 | Colvin, Jr. | 600/317 |
| 6,794,195 | B2 * | 9/2004 | Colvin, Jr. | 436/95 |
| 6,985,223 | B2 * | 1/2006 | Drachev et al. | 356/301 |
| 7,060,503 | B2 * | 6/2006 | Colvin, Jr. | 436/95 |
| 7,125,660 | B2 * | 10/2006 | Stanton et al. | 435/4 |

\* cited by examiner

*Primary Examiner*—Hezron Williams
*Assistant Examiner*—J M Saint Surin
(74) *Attorney, Agent, or Firm*—John F. Schipper; Robert M. Padilla

(57) ABSTRACT

Method and system (i) to determine when a selected target molecule is present or absent in a fluid, (2) to estimate concentration of the target molecule in the fluid and (3) estimate possible presence of a second (different) target molecule in the fluid, by analyzing differences in resonant frequencies of vibration of a thin beam suspended in the fluid, after the fluid has moved across the beam.

7 Claims, 4 Drawing Sheets

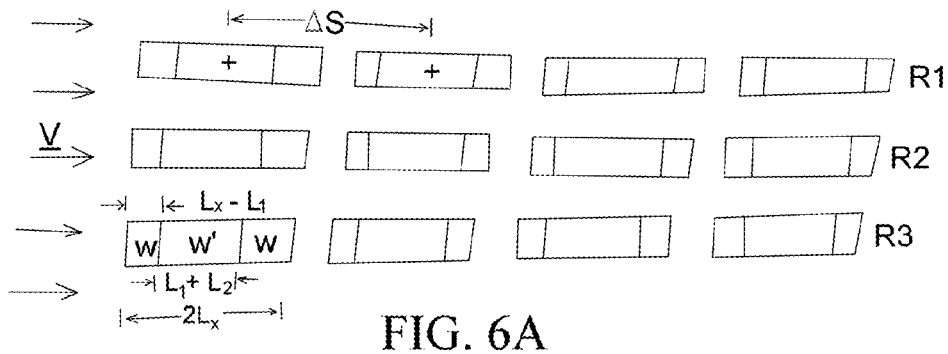
FIG. 6A
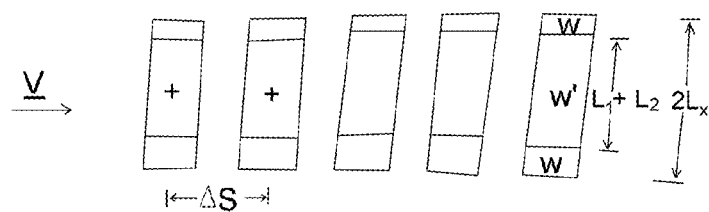
FIG. 6B
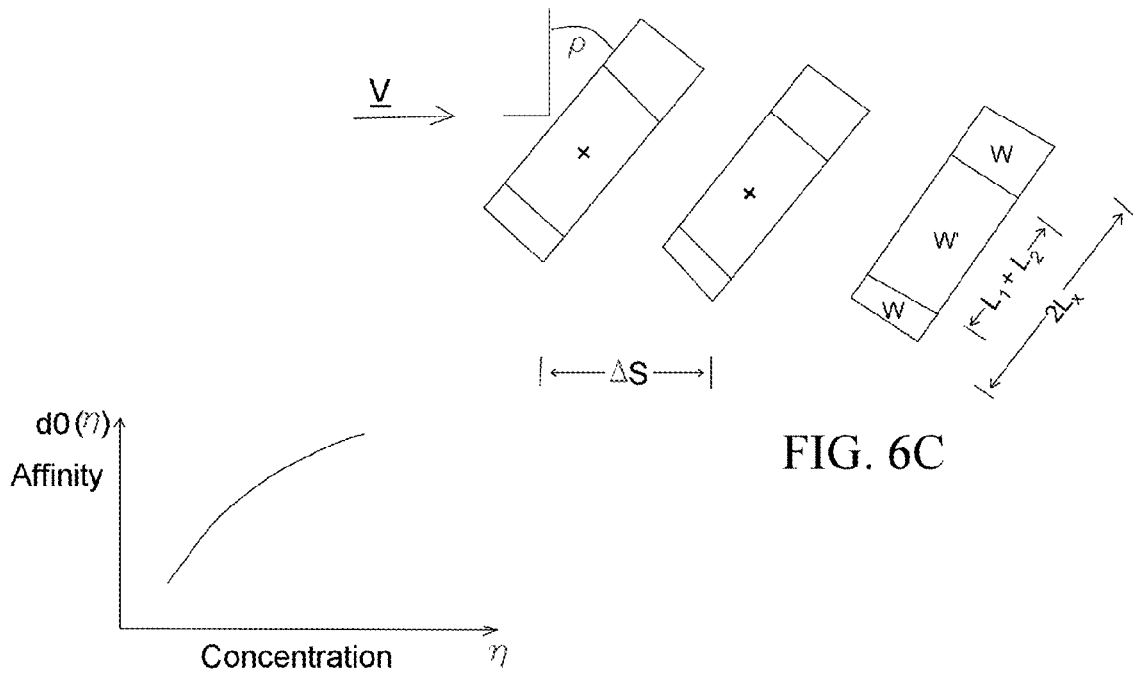
FIG. 6C
FIG. 7

US 7,549,338 B1

NANOSTRUCTURE SENSOR OF PRESENCE AND CONCENTRATION OF A TARGET MOLECULE

This application claims priority based upon, and hereby incorporates by reference, a Provisional Application, No. 60/849,494, filed 28 Sep. 2006.

ORIGIN OF THE INVENTION

This invention was made, in part, by one or more employees of the U.S. government. The U.S. government has the right to make, use and/or sell the invention described herein without payment of compensation, including but not limited to payment of royalties and other licensing fees.

FIELD OF THE INVENTION

This invention is related to sensing of presence of a target molecule in a fluid, using nanostructures.

BACKGROUND OF THE INVENTION

Several methods are presently being developed to sense presence of a target molecule having a small or modest concentration in a fluid. However, estimation of the concentration of the target molecule is unavailable, where the fluid is substantially motionless relative to the sensor, in part because the fluid in equilibrium will have substantially the same concentration everywhere. At least two questions should be answered here: (1) Is the target molecule present in the fluid; and (2) If the target molecule is present, what is its estimated initial concentration?

What is needed is a nanotechnology approach that works with fluids (liquids and gases) to determine whether a target molecule is present in the fluid, and when the target molecule is present, to estimate an initial concentration of this substance. Preferably, the approach should allow a distinction to be made, in appropriate circumstances, between presence of first and second different target molecules and should indicate when the target molecule is attached to, and has saturated, a sensor. Preferably, the approach should distinguish between presence of a given target molecule and presence of a molecule that competes with the target molecule for attachment.

SUMMARY OF THE INVENTION

These needs are met by the invention, which provides a nanostructure, having known mechanical properties and having one, two or more spaced apart beams partly coated with a selected chemical substance CS that binds to or has an affinity for the target molecule TM. The fluid is encouraged to move relative to the nanostructure and to interact with the chemical substance CS. In the absence of the target molecule TM, the microchannel has one or more predictable resonant frequencies of longitudinal vibration. Where the target molecule becomes attached to the beam the resonant frequency of vibration changes to another predictable value, according to one or more dispersion relations. Where two or more spaced apart beams are provided, the variation in number of target molecules TM attached to each of the two or more beams allows estimation of the concentration of the target molecule in the fluid. The invention allows the fluid to move relative to different sensor components to allow sensing of the presence of, and estimation of the concentration of, the target molecule. From a knowledge of the maximum concentration of the target molecule TM attached to the beam(s), the invention can also indicate whether the target molecule is saturated so that an estimate of the concentration in the fluid may be inaccurate.

BRIEF DESCRIPTION OF THE DRAWINGS

FIGS. 6A 6B and 6C illustrate systems for estimating concentration of a target molecule.

FIG. 7 graphically illustrates variation of a parameter α with target molecule concentration η.

DESCRIPTION OF BEST MODES OF THE INVENTION

Figure 1:
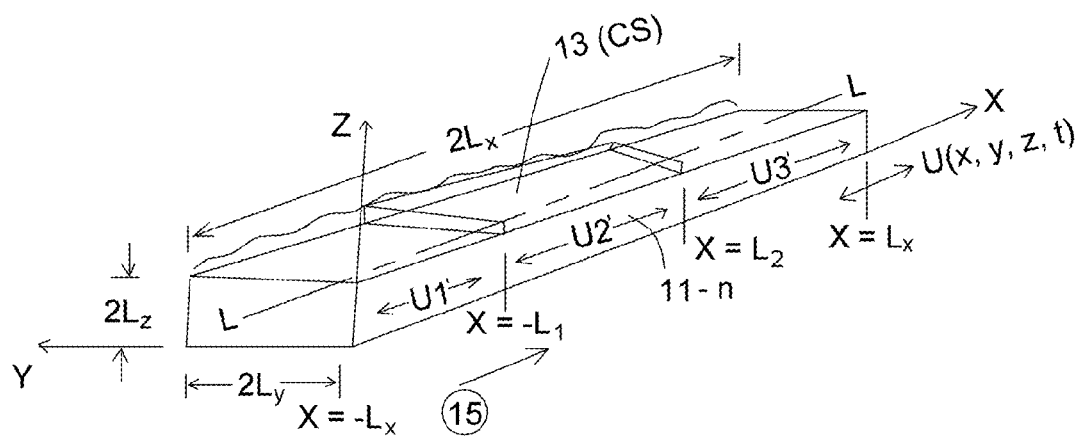
FIG. 1 schematically illustrates a channel constructed according to an embodiment of the invention.
Figure 2:
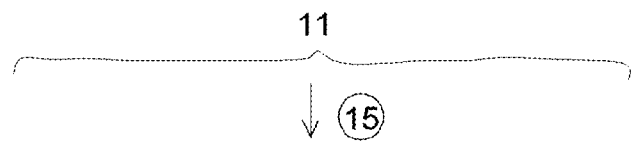
FIG. 2 is a flow chart of a procedure for practicing the invention.
Figure 2:
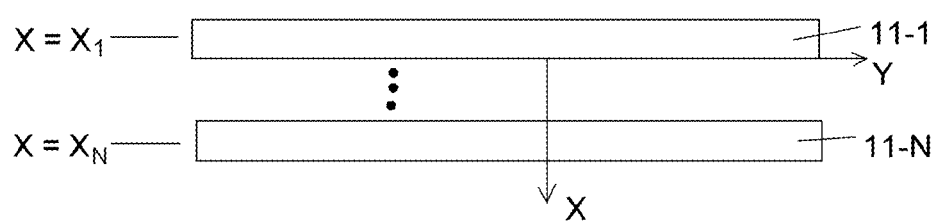

FIGS. 1 and 2 schematically illustrate an embodiment of the invention, using a sequences of one or more substantially identical, thin rectangular parallelepiped beams 11-n (n=1, . . ., N; N≧1), each attached at both ends to a non-movable wall, of solid material of dimensions $2L_x$ by $2L_y$ by $2L_z$, with known material properties and having a longitudinal axis LL in the x-direction. The beam 11 a selected chemical substance CS of width preferably $2L_y$ applied in an orientation that is substantially along the longitudinal axis LL. A fluid (liquid or gas) 15 having a known density is allowed to flow across the beam 11 and the CS. Initially, the fluid 15 is absent, and one or more resonant frequencies of each reference beam before the fluid is introduced, is estimated.

In one embodiment the chemical substance CS is a thin coating of a selected antibody, applied to vertically oriented nanostructures on a substrate, or applied directly to the substrate. The substrate plus CS coating provides a reference beam. Where two or more beams are provided, the beams are spaced apart in a selected fluid flow direction. The fluid 15 may or may not contain an antigen or other target molecule TM that binds to the antibody, and presence or absence of the TM in the fluid 15 is to be determined. The chemical substance CS need not be the full antibody: provision of a variable segment "tip" of one of the three arms of an antibody will often suffice to bind to its corresponding antigen, as discussed by W. T. Gibbs in "Nanobodies," Scientific American, August 2005, pp. 79-83. Use of a variable segment tip of an antibody as the chemical substance CS, rather than the bulky antibody itself, allows distribution of a larger number of these tips on the nanostructure surfaces, and thus allows more robust attachment to the antigen. Extremes of pH and/or temperature are less likely to denature the tips, as compared with denaturing of the full antibody.

In the absence of the target molecule TM, each of the beams 11-n is homogeneous, has a known mass w per unit length, and satisfies a relation $$(\partial/\partial x)(EA\, \partial u/\partial x)+(\partial/\partial y)(EA\, \partial u/\partial y)+(\partial/\partial z)(EA\, \partial u/\partial z)=(wA)(\partial^2 u/\partial t^2), \quad (1)$$

for longitudinal beam vibration, where E and A are Young's modulus and cross sectional area associated with the beam, respectively, and u(x,y,z,t) measures vibration distance in the x-direction of a beam volume containing the location (x,y,z). Suitable boundary conditions are $$u(x=\pm L_x, y, z, t)=0, \qquad (2)$$

The unconstrained solutions for this defining relation for the $$u(x,y,z,t)=\sin\{k_x x\}\sin\{k_y y\}\sin\{k_z z\}\cos\{\omega_0(t-t_0)\}, \qquad (3)$$

$$\omega_0(\text{ref})^2=(E/w)\{k_x^2+k_y^2+k_z^2\}, \qquad (4)$$

$$k_x=2\pi n_x/2L_x, \qquad (5\text{-}1)$$

$$k_y=2\pi n_y/2L_y, \qquad (5\text{-}2)$$

$$k_z=2\pi n_z/2L_z, \qquad (5\text{-}3)$$

$$n_x, n_y, n_z=1, 2, 3, \ldots \qquad (6)$$

The unmodified, homogeneous beam (coated with CS over a limited region, $-L_1 \leq x \leq L_2$) will vibrate longitudinally (x-direction) with a sequence of resonant angular frequencies $\omega_0(n_x,n_y,n_z)$ given by Eq. (4). The added mass for CS is usually negligible and is ignored here.

Where one of the target molecules TM becomes attached to the beam 11 in a second region ($-L_1 \leq x \leq L_2$), modified solutions for a first region ($-L_x \leq x \leq -L_1$) and for a third region ($L_2 \leq x \leq L_x$) are formally the same as in Eqs. (3) and (4), but the wavenumber parameters $k_x$, $k_y$, and $k_z$, need not be the same for the first, second and third regions and are not necessarily determined by Eqs. (5-1), (5-2) and/or (5-3). With the target molecule attached to the second region, the defining equations become $$\partial^2 u1'/\partial x^2 + \partial^2 u1'/\partial y^2 + \partial^2 u1'/\partial z^2 = (w/E)(\partial^2 u1'/\partial t^2), \qquad (7\text{-}1)$$

$$\partial^2 u2'/\partial x^2 + \partial^2 u2'/\partial y^2 + \partial^2 u2'/\partial z^2 = (w'/E)(\partial^2 u2'/\partial t^2), \qquad (7\text{-}2)$$

$$\partial^2 u3'/\partial x^2 + \partial^2 u3'/\partial y^2 + \partial^2 u3'/\partial z^2 = (w/E)(\partial^2 u3'/\partial t^2), \qquad (7\text{-}3)$$

where $w'=w+\Delta w$ is mass per unit length of the second region, with the TM attached.

The vibrating amplitude solutions for the modified beam are now written $u1'(x,y,z,t)$, $u2'(x,y,z,t)$ and $u3'(x,y,z,t)$ for the respective first, second and third regions. The boundary conditions now include Eq. (2) and the interface relations (required by continuity)

$$u1'(x=-L_1,y,z,t)=u2'(x=-L_1,y,z,t), \qquad (8)$$

$$\partial u1'(x=-L_1,y,z,t)/\partial x = \partial u2'(x=-L_1,y,z,t)/\partial x, \qquad (9)$$

$$u2'(x=L_2,y,z,t)=u3'(x=L_2,y,z,t), \qquad (10)$$

$$\partial u2'(x=L_2,y,z,t)/\partial x = \partial u3'(x=L_2,y,z,t)/\partial x. \qquad (11)$$

The vibration amplitude solutions are written as $$u1'(x,y,z,t)=\sin\{k_{x1}(-L_x-x)\}\sin\{k_y y\}\sin\{k_z z\}\cos\{\omega'_0(t-t_0)\}, \qquad (12)$$

$$u2'(x,y,z,t)=\{a\sin\{k_{x2}x\}+b\sin\{k_{x2}x\}\}\sin\{k_y y\}\sin\{k_z z\}\cos\{\omega'_0(t-t_0)\}, \qquad (13)$$

$$u3'(x,y,z,t)=\sin\{k_{x3}(L-x)\}\sin\{k_y y\}\sin\{k_z z\}\cos\{\omega'_0(t-t_0)\}, \qquad (14)$$

where $k_{x1}$, $k_{x2}$ and $k_{x3}$ are wavenumber equivalents (possibly, all different) of the quantity $k_x$ in Eq. (3), and a and b are parameters whose values are to be determined from the interface boundary conditions, Eqs. (8)-(11). The frequency of variation $\omega'_0$ for the first, second and third regions must be the same so that, in accord with the analog of Eq. (4)

$$\omega_0'^2 = (E/w)\{k_{x1}^2 + k_y^2 + k_z^2\} = (E/w')\{k_{x2}^2 + k_y^2 + k_z^2\} = (E/w)\{k_{x3}^2 + k_y^2 + k_z^2\}, \qquad (15)$$

from which one infers that $$k_{x1}=k_{x3}, \qquad (16)$$

$$k_{x2}^2-k_{x1}^2=\{(w'-w)/E\}\omega_0'^2. \qquad (17)$$

and the frequency $\omega'_0$ can be detected by an appropriate mechanism, discussed in Appendix A.

Equations (8) and 99) require that $$-\sin\{k_{x1}(L_x-L_1)\}=a\cos\{k_{x2}L_1\}-b\sin\{k_{x2}L_1\}, \qquad (18\text{-}1)$$

$$-k_{x1}\cos\{k_{x3}(L_x-L_1)\}=k_{x2}\{a\sin\{k_{x2}L_1\}+b\cos\{k_{x2}L_1\}\}, \qquad (18\text{-}2)$$

from which the parameters a and b are determined to be $$\begin{bmatrix}a\\b\end{bmatrix}=\begin{bmatrix}\cos\{k_{x2}L_1\} & (1/k_{x2})\sin\{k_{x2}L_1\}\\ -\sin\{k_{x2}L_1\} & (1/k_{x2})\cos\{k_{x2}L_1\}\end{bmatrix}\begin{bmatrix}-\sin\{k_{x1}(L_x-L_1)\}\\ -k_{x1}\cos\{-k_{x1}(L_x-L_1)\}\end{bmatrix}. \qquad (19)$$

Equations (10) and (11) require that $$\sin\{k_{x3}(L_x-L_2)\}=a\cos\{k_{x2}L_2\}+b\sin\{k_{x2}L_2\}, \qquad (20\text{-}1)$$

$$-k_{x3}\cos\{k_{x1}(L_x-L_2)\}=k_{x2}\{-a\sin\{k_{x2}L_2\}+b\cos\{k_{x2}L_2\}\} \qquad (29\text{-}2)$$

from which the parameters a and b are determined to be $$\begin{bmatrix}a\\b\end{bmatrix}=\begin{bmatrix}\cos\{k_{x2}L_2\} & -(1/k_{x2})\sin\{k_{x2}L_2\}\\ \sin\{k_{x2}L_2\} & (1/k_{x2})\cos\{k_{x2}L_2\}\end{bmatrix}\begin{bmatrix}\sin\{k_{x3}(L_x-L_2)\}\\ -k_{x3}\cos\{k_{x3}(L_x-L_2)\}\end{bmatrix}. \qquad (21)$$

Equating the parameters a in Eqs. (19) and (21) yields a first dispersion relation for the wavenumbers $k_{x1}$ and $k_{x2}$ in terms of the lengths $L_1$ and $L_2$.

$$-k_{x2}\{\cos\{k_{x2}L_1\}\sin\{k_{x1}(L_x-L_1)\}+\cos\{k_{x2}L_2\}\sin\{k_{x1}(L_x-L_2)\}\}=k_{x1}\{\sin\{k_{x2}L_2\}\cos\{k_{x1}(L_x-L_2)\}+\sin\{k_{x2}L_1\}\cos\{k_{x1}(L_x-L_1)\}\}. \qquad (22)$$

Equating the parameters b in Eqs. (19) and (21) yields a second dispersion relation for the wavenumbers $k_{x3}$ ($=k_{x1}$) and $k_{x2}$ in terms of the lengths $L_1$ and $L_2$.

$$k_{x2}\{\sin\{k_{x2}L_1\}\sin\{k_{x1}(L_x-L_1)\}-\sin\{k_{x2}L_2\}\sin\{k_{x1}(L_x-L_2)\}\}=-k_{x1}\{\cos\{k_{x2}L_2\}\cos\{k_{x1}(L_x-L_2)\}-\cos\{k_{x2}L_1\}\cos\{k_{x1}(L_x-L_1)\}\}. \qquad (23)$$

For arbitrary values of $L_1$ and arbitrary values of $L_2$, subject to the constraints $-L_x > -L_1 > L_2 > L_x$, and $L_1 + L_2 = D$ (length of a single target molecule ≈ constant), one can numerically determine a minimum frequency difference $$\Delta\omega(\min) = \min_{L_1 - L_2 = d} |\omega_0(\text{ref}) - \omega'_0| \qquad (22)$$

for presence of a single target molecule TM located at $-L_1 \leq x \leq L_2$. If an experimentally measured difference $|\omega_0(\text{ref}) - \omega'_0|$ is substantially less than $\Delta\omega(\min)$, but substantially greater than zero, this indicates that at least one other molecule, not the target molecule, ps present and is attached to the beam. Using this approach, one can distinguish between presence of one or more target molecules and presence (only) of one or more other molecules, in some situations.

More generally, when $\omega'_0$(measured) differs substantially from $\omega_0$(ref) (measured or calculated), this indicates that at least one molecule (e.g., the target molecule TM) is present and is attached to the second region. The length D of the second region, on which the chemical substance CS is coated, is preferably no longer than the diameter (known) of the specified target molecule. Adopting this constraint will limit the molecule(s) that can become attached to the CS in the second regions so that, if $\omega'_0$(measured)=$\omega'_0$(calculated, as in Eq. (15)), it is likely that the attached molecule is the TM. Further, only one TM can become attached to the single CS coating on the beam.

EXAMPLE

The chemical strip(s) 13 on the beam 11 in FIG. 1 contain a chemical substance CS, selected to serve as an quasi-antibody, by binding to a target molecule (corresponding to an antigen) so that the antigen also becomes part of an extended beam, with a corresponding increased beam mass per unit area. A suitable example of the chemical substance CS is avidin, a tetrameric glycoprotein that occurs in egg white and in certain animal tissues, that has a combined mass of 67-68 kiloDaltons (about 10 percent carbohydrate), and that binds tightly to, and inactivates, biotin. Biotin is a B vitamin and coenzyme that occurs, for example, in egg yolk. A variant of avidin, streptavidin, provides tighter and more specific binding to bacteria and other biomolecules. Unlike avidin, streptavidin has no carbohydrate. Both avidin and streptavidin can be used to link molecules, such as radioisotopes and monoclonal antibodies, together. Preferably, the avidin or streptavidin is deposited don the (bare) beam 11 as a monolayer, or in very few layers, and biotin molecules or biomolecules in the fluid 15 that pass by the beam may become strongly attached to the avidin or streptavidin. It may be preferable to use a gas, rather than a liquid, for some attachments and to use a relatively low transport rate of the fluid, to reduce the likelihood of detaching the biotin or detaching the avidin or streptavidin from the beam 11. Use of the avidin-biotin combination or the streptavidin-biotin combination is an example of the antibody-antigen combinations that can be used with the invention.

An example of longitudinal-transverse beam vibration in an ultrasonic regime is presented by J. Tsujino and H. Yoshihara in "Vibration and Welding Characteristics of High Frequency Longitudinal-Transverse Vibration Ultrasonic Wire Bonding Systems," 1998 I.E.E.E. Ultrsonics Symposium, pp. 735-738, where a steel rod, 7 mm×26.2 mm, with a free edge is found to have three longitudinal vibrating ranges, 351-368 kHz, 433-472 kHz and 916-976 kHz, and to have transverse vibration ranges of 377-382 and 926-927 kHz.

Figure 3:
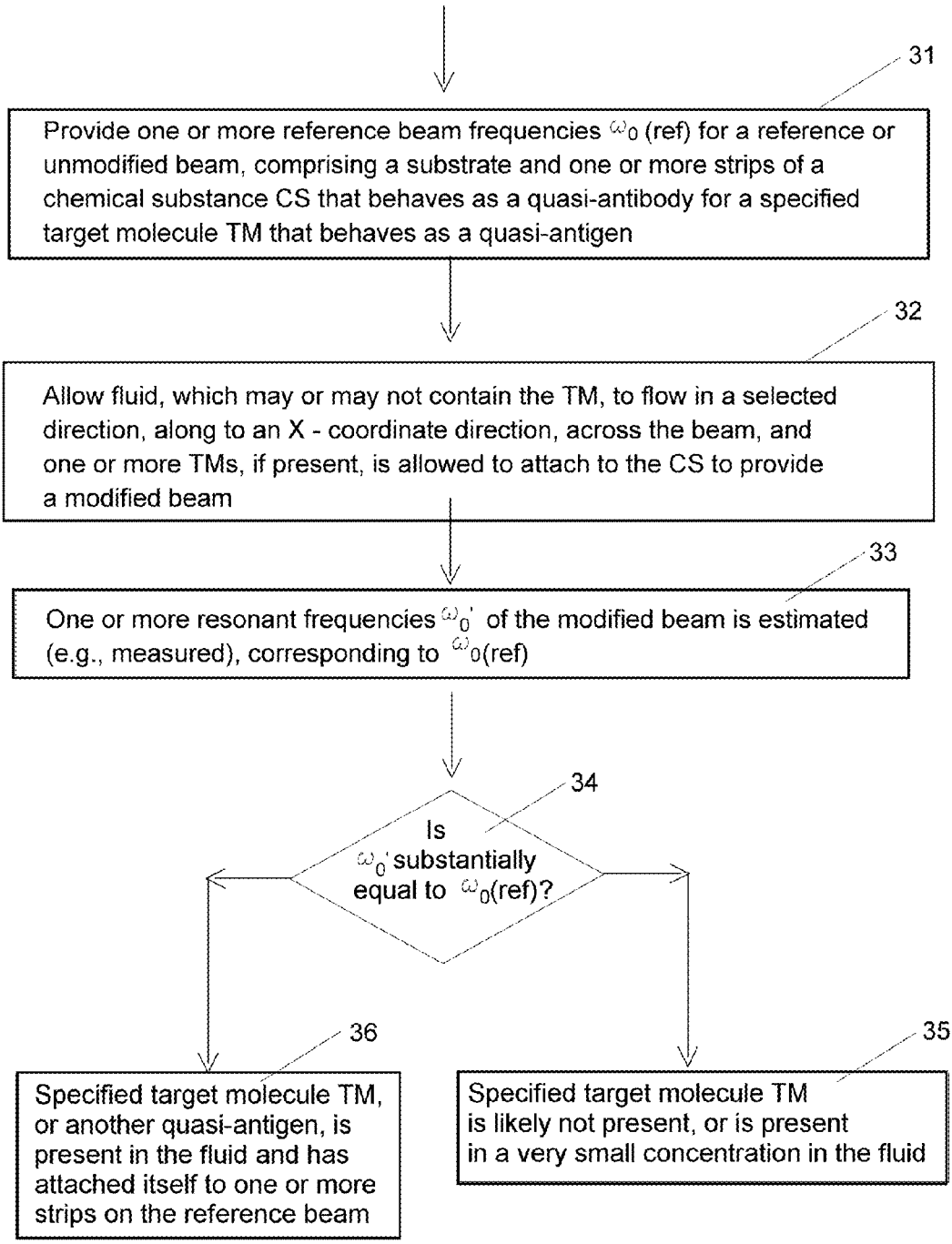
FIG. 3 is a flow chart of a procedure for practicing the invention.

FIG. 3 is a flow chart of a method for practicing an embodiment of the invention. In step 31, one or more reference beam resonant frequencies $\omega_0$(ref) are provided for a reference or unmodified beam that comprises a substrate, having one or more strips of a selected chemical substance CS that behaves as a quasi-antibody for a specified target molecule TM that behaves as a quasi-antigen. In step 32, a fluid, which may or may not contain the target molecule TM, is allowed to flow in a selected direction, transfers to a selected x-coordinate direction, across the beam; and one or more target molecules, if present is allowed to attach to the strip(s) of chemical substance CS on the beam, to provide a modified beam. In step 33, one or more resonant frequencies $\omega'_0$, of the modified beam is estimated (e.g., measured experimentally), corresponding to the one or more resonant frequencies $\omega_0$(ref) of the reference beam. In step 34, the resonant frequencies, $\omega_0$(ref) and $\omega'_0$, are compared to determine if these two resonant frequencies are substantially the same. If the answer to the query in step 34 is "yes," the system, in step 35, interprets this condition as indicating that the specified target molecule TM is likely not present, or is present in a very small concentration, in the fluid. If the answer to the query in step 34 is "no," the system, in step 36, interprets this condition as indicating that the specified target molecule TM, or at least one other molecule that serves as a quasi-antigen, is present in the fluid and has attached itself to one or more of the strips of the chemical substance CS on the reference beam.

Alternatively, a beam coating of length D may be positioned on each of two opposed surfaces (e.g, top and bottom) of the beam, with each CS coating independently becoming attached to one of the target molecules TM. The analysis of this situation is similar to the situation discussed in the preceding, except that the mass per unit length w' in Eq. (8) may have any of three values, w1 (no TM attached), w2 (one TM attached or w3 (two TMs attached).

Alternatively, a first beam coating of a first chemical substance CS1 and length D1 may be positioned on a first beam surface, and a second beam coating of a second chemical substance CS1 (CS1≠CS2) and length D2 (D1>D2) may be positioned on a second beam surface, where it is desired to estimate if a first target molecule TM1 (attached to CS1) or if a second target molecule TM2 (attached to CS2) is attached to the beam. It is assumed that $\omega'_0$(calculated−TM1) differs substantially from $\omega'_0$(calculated−TM2). Where $\omega'_0$(measured)=$\omega'_0$(TM1-calculated) or where $\omega'_0$(measured)=$\omega'_0$(calculated−TM2), it is likely that the corresponding target molecule is present and attached to the beam. Where $\omega'_0$(measured)>max{$\omega'_0$(calculated−TM1), $\omega'_0$(calculated−TM2)}, it is likely that TM1 and TM2 are both present and are both attached to the beam. A separate calculation would be required to accurately estimate the frequency value $\omega'_0$(calculated−TM1 and TM2 present), because of possible overlap of the x-coordinate regions for coating by CS1 and by CS2.

APPENDIX A

Estimation of Beam Resonant Frequency

Figure 4:
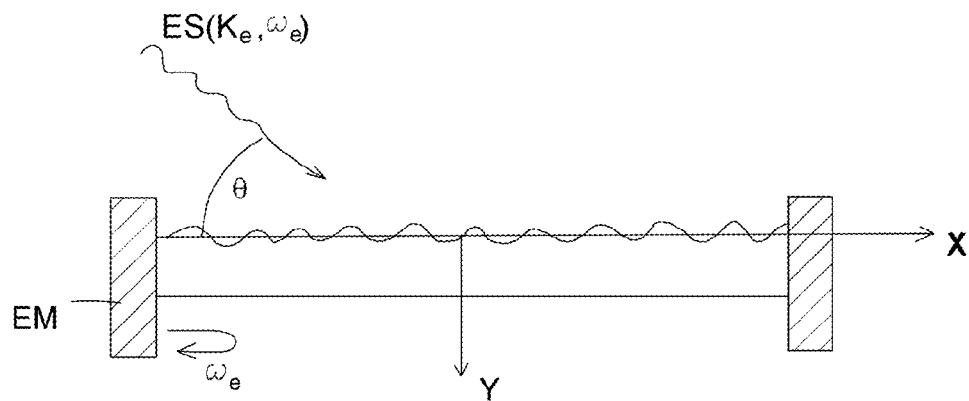
FIG. 4 illustrates a mechanism for determination of a wavenumber or frequency solution according to the invention.

FIG. 4 schematically illustrates an embodiment for determination of the wavenumber solutions $\{k_x, k'_x\}$, or of the corresponding angular frequency solutions $\omega_0$, using diffraction of electromagnetic signals. The beam is excited by longitudinally vibrations at a selected angular frequency ω, which may or may not coincide with a solution frequency $\omega_0$, by a suitable excitation mechanism EM. A narrow beam, monochromatic electromagnetic signal $$ES \propto \cos\{k_e s - \omega_e t\}, \quad (A\text{-}1)$$

having a selected excitation frequency $\omega_e$, is directed at the beam at a selected incidence angle θ, relative to the longitudinal (x-coordinate) direction.

Figure 5:
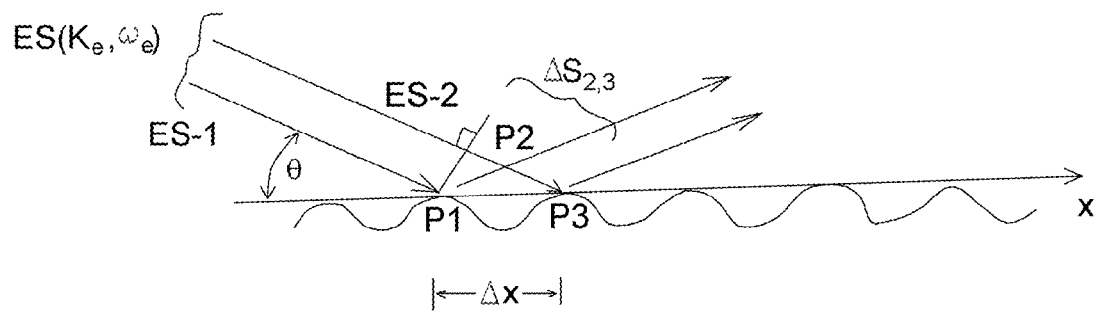
FIG. 5 schematically illustrates reflection or diffraction of an incident electromagnetic wave by a vibrating beam.

The excited beam manifests a uniformly spaced sequence of undulations or ripples in the x-direction, illustrated in FIG. 5, and a portion of the signal ES is reflected or diffracted from the undulating beam surface. One goal is to choose a combination of excitation frequency and incidence angle $(\omega_e, \theta)$ for which the phase $k_e s - \omega_e t$ for the excitation signal ES arriving at each peak of the undulation pattern differs by an integral multiple of 2π. Consider the two signal "rays" ES-1 and ES-2 arriving at two adjacent undulation peaks, as in FIG. 4(???). The distance between the two adjacent peaks is $\Delta x = 2\pi/k_x$, and the distance from the location P2 to the location P3 on the undulation peak P3 is $$\Delta s_{2,3} = \Delta x \sin\theta. \quad (A\text{-}2)$$

and the time required for the signal ray to propagate this distance is $$\Delta s_{2,3}/c = \Delta s_{2,3} k_e/\omega_e, \quad (A\text{-}3)$$

where $$c = \omega_e/k_e \quad (A\text{-}4)$$

is the velocity of electromagnetic propagation of the excitation signal ES in the ambient medium. Preferably, the elapsed time $\Delta s_{2,3}/c$ is an integer multiple K of a time increment $$\Delta t(P1, P3) = k_x/\omega_0, \quad (A\text{-}5)$$

of a time required for a beam amplitude peak at position P1 to move to the position P3; that is, $$\Delta s_{2,3} k_e/\omega_e = (2\pi \sin\theta)/(ck_x) = K k_x/\omega_0 (K=1, 2, 3, \ldots), \quad (A\text{-}6)$$

where $k_x$ and $\omega_0$ are determined as in the preceding analysis in the specification.

Equation (A-6) determines the incidence angle θ in terms of the known quantities $k_x$, $\omega_0$ and c. When a match occurs, Eq. (A-6) allows an estimation of $\omega_0$ and/or $k_x$ for the vibrating beam for a small integer multiple, such as K=1, 2 or 3. Experimentally, a resonant frequency $\omega_0(\exp)$ of the beam can be estimated, using a thermocouple or similar heat measuring device and estimating an excitation angular frequency ω at which maximum beam heating occurs in a selected time interval, such as 5-30 sec. A resonant frequency can also be estimated by observing the beam vibration amplitude and estimating a frequency at which the amplitude is maximized.

The estimated beam resonant frequency $\omega_0(\exp)$, after beam flow-by, is compared with the reference resonant frequency $\omega_0(\text{ref})$ for the "bare" beam in the absence of attachment of any target molecules or other quasi-antigens to the beam. Where the two resonant frequencies agree within a small difference, the system concludes that the target molecule TM is not present in the fluid. Where the two resonant frequencies do not substantially agree, the frequency difference can be used with the preceding analysis to estimate the mass per unit length w' of a target molecule TM attached to the beam, from a measurements of resonant frequencies of a beam to which the target molecule TM is attached. To avoid ambiguity, it is preferable to provide an isolated beam coating on a beam, as illustrated in FIGS. 6A, 6B and 6C, with a length approximately equal to a single length D of the target molecule TM.

APPENDIX B

Estimation of Target Molecule Concentration

Appendix A sets forth a method for experimental determination of the wavenumber solutions or the corresponding angular frequency solutions for a single beam. Where two or more (preferably, three or more) beams, spaced apart in the fluid flow direction, are provided, as in FIGS 6A-6C, one can estimate concentration of the target molecule TM in the fluid.

Consider an array of spaced apart beams 61A-n (n=0, 1, . . ., N) of length $2L_x$, as shown in FIG. 6A, where the beam center coordinate, $x = x_n$, has a value, $x_n = x_0 + n \cdot xy$ ($\Delta x$=fixed positive value), where $x_0$ is a selected value. The distance, $L_x - L_1$, of an interface between a beam portion that is coated with CS and an uncoated portion is preferably the same, but need not be the same, for each of the beams. Allow a fluid having a known concentration, η=η1, of the target molecule to flow past the beams 61A-n in the y-direction. Some, but probably not all, of the coated regions CR(n) will, as a result of the fluid flow-by of finite time duration, attach to and hold a target molecule TM; and as a result of such attachment the concentration of target molecules TM will decrease roughly exponentially as the downstream distance y increases. The target molecule concentration C(x,y,z) at a downstream distance near a beam center can be approximated as $$C(x=x_n, y, z) \approx C_0 \exp\{-\alpha n \cdot \Delta y\}, \quad (B\text{-}1)$$

where the parameter α (>0) is a measure of the affinity of CS for the TM and/or of an initial concentration of the TM, and an initial concentration $C_0$ is roughly constant ($\approx \eta 1$) throughout the fluid. The value of the parameter α will depend upon the concentration η1 and can be estimated by (1) performing a sequence of flow-by experiments for the same time duration on a sequence of the array of N beams shown in FIG. 6A; (2) allowing a first subset of the TM in the fluid to become attached to and held by a second subset of the coated regions; (3) measuring the cumulative number ν(n)(=0, 1, . . . , n) of CS-coated regions that do not have a TM attached thereto; (4) repeating the steps (1)-(3) P times to obtain an average cumulative number ν(n;mean) for the P experiments for the initial concentration η1; (5) forming an error estimate $$\varepsilon(\alpha) = \sum_{n=0}^{N} w_n \{\nu(n; \text{mean}) - C_0 \exp\{-\alpha n \cdot \Delta s\}\}^2; \quad (B\text{-}2)$$

where $w_n$ are selected non-negative weight values and q is a selected positive value (preferably, q≧1; for example, q=2); (6) estimating α=α(η1) according to a minimization procedure, such as $$\partial \varepsilon(\alpha)/\partial \alpha = 0, \quad (B\text{-}3)$$

from which the value of α is estimated; and (7) repeating steps (1)-(6) for at least two other distinct initial concentration values, η=η2 and η=η3, for the fluid.

The estimated value of α0(η) will increase monotonically (approximately linearly over short intervals) with increasing TM concentration η, except at very high concentrations, where the value of α0(η) will likely saturate. It is preferable to perform steps (1)-(6) for at least 3-10 concentration values, spaced apart by multiplicative factors of 1.5-3, to provide an interpolation curve, α0=IC (η) versus η, as illustrated in FIG. 7.

As an example of this minimization procedure, with q=2 and $$u = \exp(-\alpha \Delta As)\}, \quad (B-4)$$

where Δs is known by α not yet known, Eq. (B-3) can be re-expressed as a polynomial equation in u:

$$\frac{\partial \varepsilon(\alpha)}{\partial \alpha} = 2\sum_{n=1}^{N} w_n(n \cdot \Delta s)\{(v(n; \text{mean})u^n - u^{2n}\} = 0 \ldots \quad (B-5)$$

When the (real) solutions u of Eq. (B-5) are determined or estimated, the corresponding values of α can be estimated from Eq. (B-4). Among a sequence of values of α, the smallest positive value is often preferred. Alternatively, the affinity parameter α can be estimated as $$\alpha = \ln\{C(x=x_1,y,z)/C(x=x_n,y,z)\}/(x_n-x_1), \quad (B-6)$$

which an be used to initially estimate the TM concentration, using IC(α).

To obtain an estimate of the (unknown) concentration η of the TM in the fluid of interest, this fluid is allowed or encouraged to flow past the sequence of N beams, and each of the N beams is interrogated, for example, as in Appendix A, to determine which beams in the sequence have a TM attached thereto. The monotonic sequence ν(n) is determined, as in step (3), and a value, α=α0, that minimizes the error sum ε(α) in Eq. (B-2) is estimated. The interpolation curve α0=IC(η) is then examined to estimate the corresponding TM concentration value solution η0 for which α0=IC(η0). This value, η=η0, is an estimate of the TM concentration in the fluid of interest.

The sequence or array of beams may also be arranged with longitudinal (x-) axes perpendicular to the fluid flow direction, as in FIG. 6B, or with longitudinal (x-) axes transverse at an angle φ relative to the fluid flow direction, as in FIG. 6C.

What is claimed is:

1. A method for sensing at least one or presence of, and concentration of, a target molecule that may be present in a fluid, the method comprising:
   providing a first thin beam, having a strip of a selected chemical substance of a selected length D, oriented substantially parallel to a longitudinal axis of the beam, on at least one surface of the beam, where the selected chemical substance binds to a selected target molecule;
   providing a first resonant frequency ω1 of vibration of the first beam and the at least one strip;
   allowing a selected test fluid, which may contain a target molecule in an unknown concentration, to flow past the first beam for a selected time duration Δt, to provide a modified first beam;
   providing an estimated second resonant frequency ω2(est) of vibration of the modified first beam;
   providing a measured second resonant frequency ω2(meas) of vibration of the modified first beam, where ω2(est) is substantially different from ω1;
   when the frequency ω2(meas) is substantially equal to ω1, interpreting this condition as indicating that the target molecule is not present in the fluid; and
   when the frequency ω2 (meas) is substantially equal to ω2(est), interpreting this condition as indicating that the target molecule is present in the fluid.

2. The method of claim 1, wherein said process of providing said first resonant frequency ω1 comprises:
   providing a mathematical solution for a partial differential equation that expresses an amplitude u(r,t) of a longitudinal vibration of said first reference beam with at least one selected boundary condition imposed, where r represents a vector of at least one location coordinate x for an arbitrary location on said first beam and t represents a time variable, where x is measured along said first beam longitudinal axis; and
   estimating said first resonant frequency ω1 from a first dispersion relation that relates ω1 to at least a first parameter $k_x$ that is determinable from the at least one boundary condition imposed on the solution u(r,t) for said first beam, where said target molecule is not present.

3. The method of claim 2, wherein said process of providing said estimated frequency ω2(est) comprises:
   providing a mathematical solution for a partial differential equation that expresses an amplitude u'(r,t) of a longitudinal vibration of said modified first beam with at least one selected boundary condition imposed, where r represents a vector of at least one location coordinate x for an arbitrary location on said modified first beam and t represents a tine variable, where x is measured along said modified first beam longitudinal axis; and
   estimating said first resonant frequency ω2(est) from a second dispersion relation that relates ω2 to at least one wavenumber parameter $k'_x$ that is determinable from the at least one boundary condition imposed on the solution u'(r,t) for said modified first beam, where said target molecule is assumed to be present and to be attached to said modified first beam.

4. The method of claim 3, further comprising:
   providing an estimate of a minimum frequency difference Δω(min)=min{|ω2(est)−ω1|}, where at least one of said target molecule is present on said modified first beam; and
   when an estimated frequency difference |ω2−ω1| is substantially less than the minimum frequency difference Δω(min), interpreting this condition as indicating that at least one molecule, other than said target molecule, is attached to said modified first beam.

5. The method of claim 1, further comprising selecting said chemical substance to comprise either avidin or streptavidin and choosing said target molecule to comprise biotin.

6. The method of claim 1, comprising:
   (i) providing an ordered sequence of N−1 supplemental beams, numbered m=2, ..., N(N≧3), each substantially identical to and spaced apart from and substantially parallel to said first beam, numbered m=1, and each supplemental beam having a strip of said selected chemical substance of length substantially equal to D on at least one surface, where supplemental beam .no.m is spaced apart downstream from said first beam by a distance of approximately (m−1)Δs in a direction of flow of said test fluid;
   (ii) allowing said test fluid, having a known initial concentration, η=η1 of said target molecule, to flow across said first beam and across the N−1 supplemental beams to provide N modified first beams, numbered m'=1, ..., N;
   (iii) determining, for the N modified beams, whether beam no. m' has said target molecule attached thereto;
   (iv) determining a number ν(n) of beams, among the beams no. m'=1, ..., n, that have said target molecule attached thereto;
   (v) estimating a value, α=α0(η), for which an error sum $$\varepsilon(\alpha) = \sum_{n=1}^{N} w_n |v(n) - \eta 1 \exp\{-\alpha \cdot n \cdot \Delta s\}|$$

is minimized, where $w_n$ is a selected non-negative value;

(vi) repeating steps (ii)-(v) for said test fluid, having a known initial concentration, $\eta = \eta 2$ ($\approx \eta 1$) of said target molecule in said test fluid;

(vii) repeating steps (ii)-(v) for said test fluid, having a known initial concentration, $\eta = \eta 3$ ($\approx \eta 1$, $\approx \eta 2$) of said target molecule in said test fluid; and (viii) estimating a relationship, $\alpha 0 = \alpha 0(\eta)$, between the value $\alpha 0$ and a concentration $\eta$ of said target molecule in said fluid from the values $\alpha 0(\theta 1)$, $\alpha 0(\eta 2)$ and $\alpha 0(\eta 3)$.

7. The method of claim 6, further comprising:

(ix) providing said first beam, numbered m=1, and said ordered sequences of N−1 supplemental beams, numbered m=2, ..., N (N≧3), each substantially identical to and spaced apart from and substantially parallel to said first beam, numbered m=1, and each supplemental beam having said strip of said selected chemical substance of length substantially equal to D on at least on surface, where supplemental beam .no. m is spaced apart downstream from said first beam by a distance of approximately (m−1)Δs in a direction of flow of said test fluid;

(x) allowing said selected test fluid, having said unknown concentration of said target molecule, to flow across said first beam and across said N−1 supplemental beams to provide said N modified first beams, numbered m'=1, ..., N;

(xi) determining, for said N modified beams, whether said beam no. m' has said target molecule attached thereto;

(xii) determining a number v'(n) of beams, among said modified beams, no. m'=1, ..., n, that have said target molecule attached thereto;

(xiii) estimating a concentration value $\eta'$ for said target molecule in said selected test fluid for which an error sum $$\varepsilon'(\alpha 0) = \sum_{n=1}^{N} w_n |v'(n) - \eta' \exp\{-\alpha 0(\eta') \cdot n \cdot \Delta s\}|$$

is minimized; and (xiv) interpreting this condition as indicating that said concentration value for said target molecule in said selected test fluid is approximately $\eta'$.

\* \* \* \* \*